July 18, 1967  C. K. BROWN  3,331,278
SEPARABLE FASTENER ASSEMBLY
Original Filed March 9, 1965  2 Sheets-Sheet 1
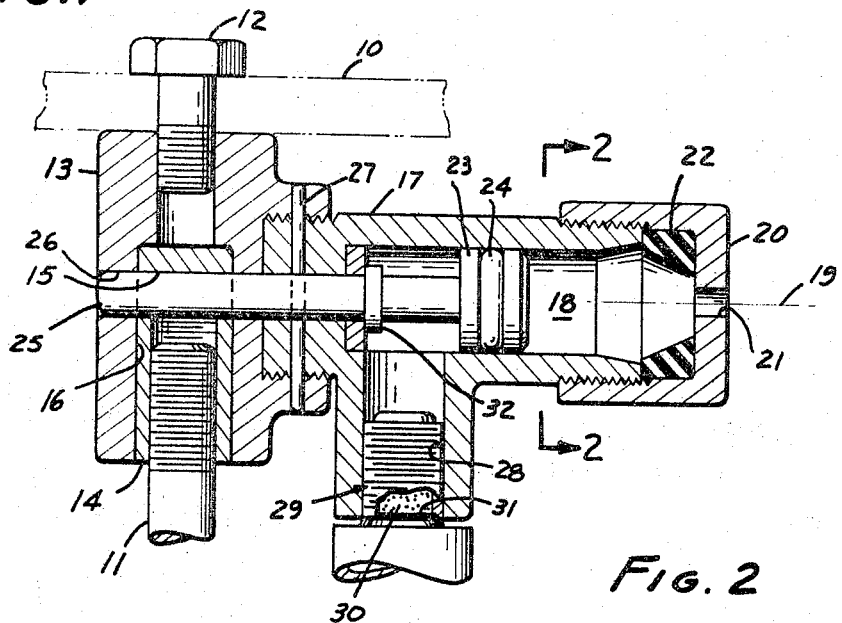
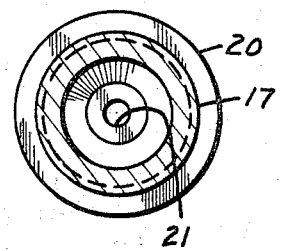
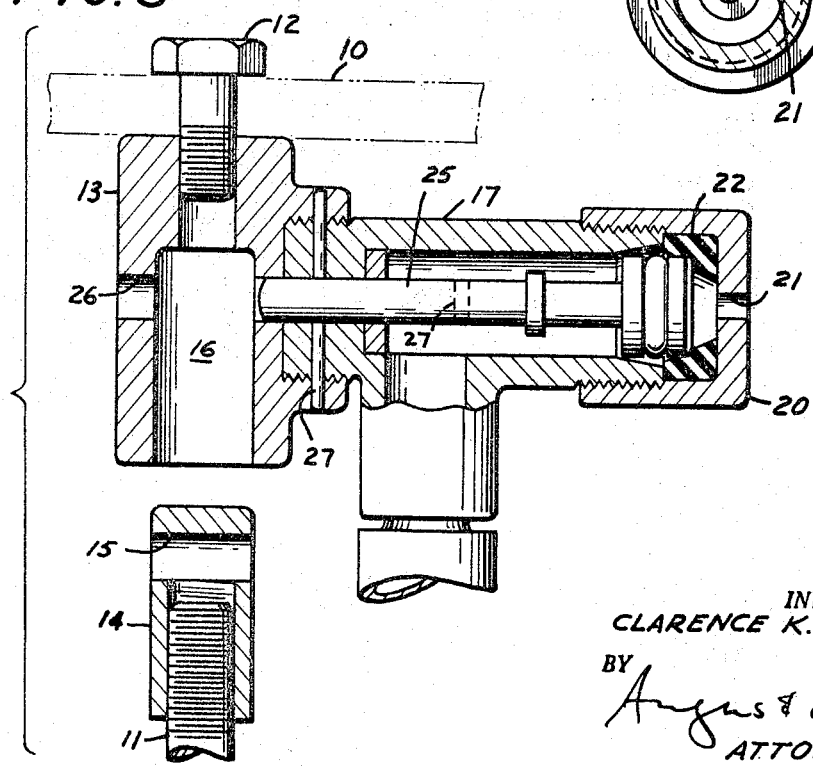
INVENTOR.
CLARENCE K. BROWN
BY
ATTORNEYS.

July 18, 1967 C. K. BROWN 3,331,278
SEPARABLE FASTENER ASSEMBLY
Original Filed March 9, 1965 2 Sheets-Sheet 2
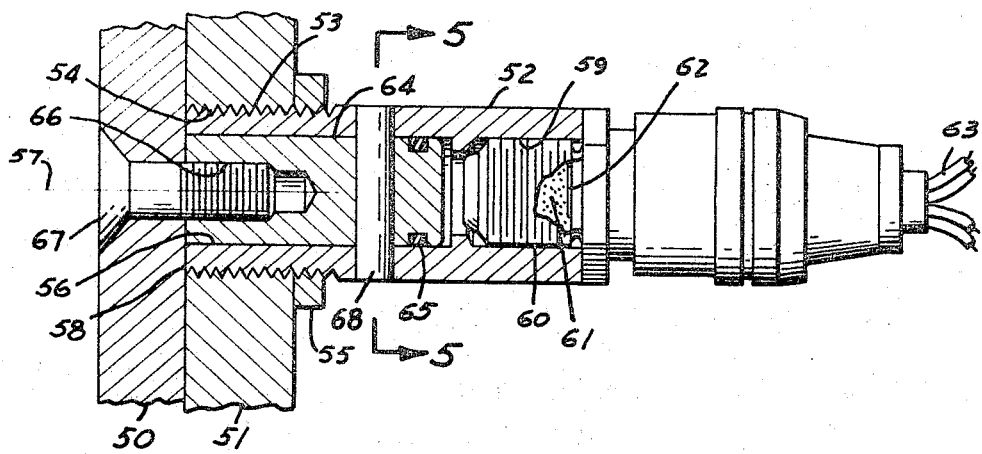
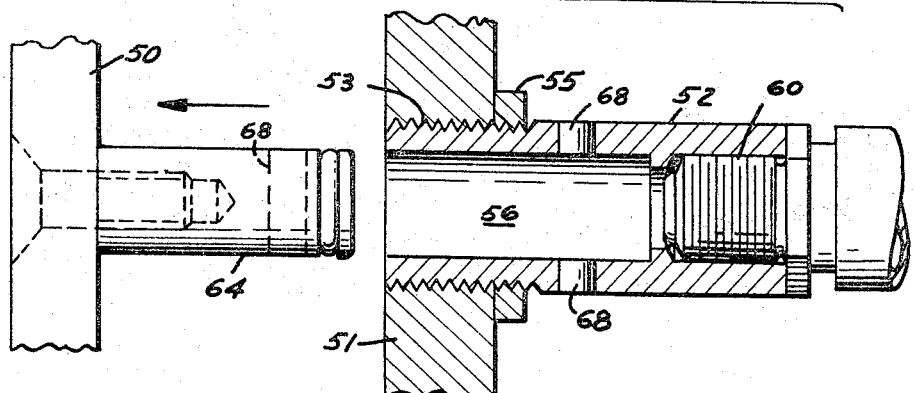
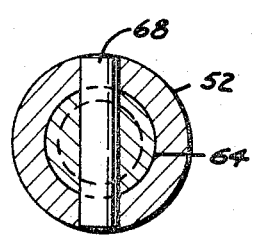
INVENTOR.
CLARENCE K. BROWN
BY
ATTORNEYS.

United States Patent Office 3,331,278
Patented July 18, 1967

3,331,278
SEPARABLE FASTENER ASSEMBLY
Clarence K. Brown, Long Beach, Calif., assignor to Hi-Shear Corporation, Torrance, Calif., a corporation of California
Original application Mar. 9, 1965, Ser. No. 441,407, now Patent No. 3,261,261, dated July 19, 1966. Divided and this application Jan. 13, 1966, Ser. No. 540,424
4 Claims. (Cl. 89—1)

This application is a division of applicant's copending patent application, Ser. No. 441,407, filed Mar. 9, 1965, now Patent No. 3,261,261, granted July 19, 1966, entitled, "Separable Fastener Assembly," which in turn is a continuation of Ser. No. 162,718, filed Dec. 28, 1961, now abandoned, entitled, "Separable Fastener Assembly."

This application relates to separable fastener assemblies.

There are numerous applications where assemblies are fastened together in such a manner that they can be separated on a signal. Conventional techniques for carrying this out include explosive bolts, guillotine devices, and the like, wherein a high strength part of the fastener is fractured to effect the separation. Such a technique involves the risk of damaging neighboring structure, because the charge must be large enough to be sure to effect the fracture, or, in the event the charge is not large enough, there is the risk that separation might not occur.

It is an object of this invention to provide apparatus for joining and accomplishing the separation of a pair of assemblies in which the separation can be effected by explosive means, but in which the explosive means need only overcome the resistance of a shear pin whose strength need not be as great as the main-bearing parts of the fastener, and which can be precisely determined. Then a minimal charge can be used, and risk of damaging neighboring structure, and of failure to separate, are significantly reduced.

It is an optional object of the invention to include thruster means in such apparatus to provide positive separation of the joined assemblies.

It is still another optional object of the invention to provide pin-pulling means for pin-detent fastener mechanisms.

Apparatus according to the invention comprises a body attachable to one of a pair of assemblies to be separably joined. The body has an internal cylinder, and a piston slidedly fitted in the cylinder adapted to engage the other of the assemblies. A shear pin interconnects the piston and the body, and holds them against relative axial movement until sheared by sufficient force applied to the piston. Explosive means are provided in fluid communication with the cylinder, which is adapted to discharge gas under pressure into the cylinder to shear the shear pin and move the piston and cylinder relative to each other to disengage the assemblies.

According to a preferred but optional feature of the invention, the piston is attached directly to its respective assembly so as to drive the assemblies apart when the explosive means is actuated.

According to still another preferred but optional feature of the invention, the piston comprises a pin which makes a keying connection with its respective assembly, whereby upon actuation of the explosive means, the pin is pulled to release the assemblies.

The above and other features of this invention will be fully understood from the following detailed description and the accompanying drawings, in which:

FIG. 1 is a side elevation, partly in cutaway cross-section showing an embodiment of the invention in assembly-joining position;

FIG. 2 is a cross-section taken at line 2—2 of FIG. 1;

FIG. 3 is a view as in FIG. 1, but with the device in separated position;

FIG. 4 is a side elevation, partly in cutaway cross-section, showing the preferred embodiment of the invention in assembly-joining position;

FIG. 5 is a cross-section taken at line 5—5 of FIG. 4;

FIG. 6 is a view as in FIG. 4, but with the device in separated position; and

FIG. 7 is a fragmentary cross-section of a modification of the device of FIG. 4.

FIG. 1 illustrates a pin-puller type drive type wherein two assemblies 10, 11 are joined. Bolt 12 attaches assembly 10 to body 13, and an insert 14 having a cross port 15 fits in hole 16 in the body for attaching assembly 11 to the body.

The body has a neck portion 17 which encloses a cylinder 18 which has an axis 19. A cap 20 closes the right hand end of the cylinder. A vent 21 passes through the cap.

A ring 22 of deformable material is held in the cylinder by the cap. The material is deformable in the sense that it can be permanently deformed. Crushing is an example of such permanent deformation. A suitable substance is 2SO Aluminum. Energy dissipated in deforming the material will not be conducted to the body as a shock, and this aids in protecting surrounding assemblies from sharp forces which would otherwise be exerted by the piston's slamming against the cap.

A piston 23 carries an O-ring 24 for sealing with the cylinder. The piston is axially movable in the cylinder. A rod 25 forms a continuation of the piston, and passes through the body, through hole 16, and into hole 26.

A shear pin 27 joins the body and piston in the position illustrated by FIG. 1. It holds the body and piston against relative axial movement, and is in full bearing in the holes so as to provide an effective, reliable, and predictable safety means which will withstand loads below its design limit, and yield to free the device at the design limit.

A squib port 28 is in fluid communication with cylinder 18 and receives a squib 29. The squib contains explosive means 30 actuable by a signal, usually an electric current applied to a bridge wire 31 in contact with the explosive inside the squib.

A collar 32 on the piston limits its movement to the left.

In FIG. 4, there is shown the presently preferred embodiment of the invention used to join assemblies 50, 51 together. This device includes a body 52 with external threads 53 which are adapted to be threaded into internal threads 54 in assembly 51. A locknut 55 locks the assembly 51 and body 52 together.

A cylinder 56 extends along axis 57 into the body from first end 58 thereof. The body includes a threaded squib port 59 which is in fluid communication with cylinder 56. It receives an externally threaded squib 60, which squib includes explosive means 61 such as a charge ignitable by a signal, for example an electric current passed through bridge wire 62 in contact with the charge. In this squib, as in squib 29 in FIG. 1, leads 63 may be provided for conducting electric current to the bridge wire.

A piston 64 is slidably fitted in the cylinder and bears an O-ring 65 for fluidly sealing with the cylinder. The piston includes attachment means 66 in the form of an internally threaded opening in the end of the piston adjacent to first end 58 of the body. This is for the purpose of receiving means such as bolt 67 for attaching assembly 50 to the piston.

A shear pin 68 joins the piston and the body together in full bearing contact in the holes and holds them assembled in the position shown in FIG. 4. This pin holds the load, and is accurately sized relative to its inherent strength so as both to hold the design load, and to yield at the design force from the squib.

In FIG. 7, piston 64 is shown receiving the end of a stepped bolt 100. The bolt has an enlarged shank with a diameter adapted to fit in hole 101 in assembly 102. The diameter of hole 101 is greater than the diameter of the piston, so as to avoid the risk of the piston's hanging up instead of passing straight through assembly 102. This modification is useful when it is not desired to thrust assemblies 102 and 103 apart, and when it is not objectionable to free the piston from the assemblies.

The operation of the device of FIGS. 1–3 will be readily understood from the drawings. Assemblies 10 and 11 are held together by piston 23, and they cannot be separated unless it is withdrawn. To withdraw the pin, the squib is fired, which will move the piston to the right, withdrawing it to the position shown in FIG. 3. This enables the assembly 11 and its insert 14 to fall away from the body. It will be noted that no loose pieces are generated, and that all of the fastener system goes with respective assemblies. As soon as the force is sufficiently great, the shear pin is sheared across a shear face defined by the sliding contiguous contact between the body and the rod and the pin is withdrawn.

When the piston reaches the position shown in FIG. 3, it deforms ring 22, thereby dissipating some or all of the kinetic energy of the piston, and reducing the shock on the assembly pin which otherwise would be directly transmitted from the piston through the body.

It will be noted that this device is reusable by unthreading the cap, replacing the ring, squib, and the shear pin. Ring 22 is optional and used only in the event that it is desired to minimize shock on the surrounding structure.

The operation of the device of FIGS. 4–6 is similar. The devices are firmly held together by the attachments shown until the shear pin is sheared. This is accomplished by firing the squib which forces the piston to the left. This shears the shear pin across a shear face defined by the sliding contiguous contact between the cylinder and piston and then, of great importance in this particular embodiment, it shoots the two assemblies apart by firmly expelling the piston from the cylinder. As in the device of FIGS. 1–3, all parts are retained to the assemblies and no loose parts are scattered around. It will also be observed that this device is reusable by replacing the shear pin and the squib.

The device of FIG. 7 functions like that of FIG. 4, except that the piston and the stepped bolt are fired away from the assemblies, and the assemblies are not thrust apart.

This invention thereby provides means for reliably joining bodies together and for separating them by the application of minimal forces which can be closely related to the strength of the simple pin to be sheared.

The inventions provide additional advantages of pin-puller type separations and also of positive separation of the assemblies.

This invention is not to be limited by the embodiments shown in the drawings and described in the description which are given by way of example and not of limitation, but only in accordance with the scope of the appended claims.

I claim:

1. Apparatus for joining and accomplishing the separation of a pair of assemblies, comprising: a body having a cylinder opening at a first end of the body; an external thread at said first end for attaching the body to one of the assemblies; a piston slidedly fitted in such cylinder in contiguous contact therewith and adapted to be totally expelled from said cylinder; attachment means on the piston at its end adjacent said first end for attachment to the other of said assemblies, said attachment means comprising an internally threaded opening in the end of said piston adjacent said first end, said threaded opening being adapted to receive a bolt for attachment to the other of said assemblies; a shear pin seated in full bearing contact in and interconnecting the body and the piston, the sliding contiguous contact between cylinder and piston adjacent the pin defining a shear face across said pin, said pin being so disposed and arranged as to hold the body and piston against relative axial movement and the assembly load until sheared by sufficient force applied to accomplish said shearing and cause such axial movement, the apparatus thereby serving as structural interconnection for the assemblies; and explosive means in fluid communication with the cylinder on the opposite side of the piston from said first end adapted to discharge gas under pressure to apply said force, thereby moving said piston to disengage and separate the assemblies, and expelling said piston from said cylinder to assure positive separation, the division of the shear pin occurring solely at the shear face.

2. Apparatus according to claim 1 in which the bolt is adapted to secure the other of said assemblies to said piston between a head on said bolt and said end of said piston adjacent said first end.

3. Apparatus for joining and accomplishing the separation of a pair of assemblies, comprising: a body having a cylinder opening at a first end of the body; an external thread at said first end for attaching the body to one of the assemblies; a piston slidedly fitting in said cylinder and adapted to be totally expelled from said cylinder; attachment means on the piston at its end adjacent said first end for attachment to the other of said assemblies, said attachment means comprising an internally threaded opening in the end of said piston adjacent said first end, said threaded opening being adapted to receive a bolt for attachment to the other of said assemblies; a shear pin seated in full bearing contact in and interconnecting the body and the piston, a sliding contiguous contact between cylinder and piston adjacent the pin defining a shear face across said pin, said pin being so disposed and arranged so as to hold the body and piston against relative axial movement and the assembly load until sheared by sufficient force applied to accomplish said shearing and cause such axial movement, the apparatus thereby serving as a structural interconnection for the assemblies; and explosive means in fluid communication with the cylinder on the opposite side of the piston from said first end, adapted to discharge gas under pressure to apply said force, said explosive means comprising a squib in a threaded housing, an internally threaded port being formed in the body to receive the housing, and to permit the squib to discharge into said body, said discharge of gas under pressure moving said piston to disengage and separate the assemblies, and expelling said piston from said cylinder to assure positive separation, the division of the shear pin occurring solely at the shear face.

4. Apparatus according to claim 3 in which the bolt is adapted to secure the other of said assemblies to said piston between a head on said bolt and said end of said piston adjacent said first end.

References Cited

UNITED STATES PATENTS

| 2,489,984 | 11/1949 | Shoemaker | 89—1.5 |
| 2,585,870 | 2/1952 | Spielman | 89—1.5 |
| 2,732,765 | 1/1956 | Boyd | 89—1.5 |
| 3,084,597 | 4/1963 | Beyer | 89—1.01 |
| 3,119,298 | 1/1964 | Brown | 89—1.01 X |

SAMUEL W. ENGLE, *Primary Examiner.*

BENJAMIN A. BORCHELT, *Examiner.*

UNITED STATES PATENT OFFICE

CERTIFICATE OF CORRECTION

Patent No. 3,331,278                                 July 18, 1967

Clarence K. Brown

It is hereby certified that error appears in the above numbered patent requiring correction and that the said Letters Patent should read as corrected below.

Column 2, line 14, for "drive type" read -- device --; column 3, line 73, for "such" read -- said --.

Signed and sealed this 23rd day of July 1968.

(SEAL)
Attest:

Edward M. Fletcher, Jr.                              EDWARD J. BRENNER

Attesting Officer                                        Commissioner of Patents